United States Patent [19]
Cho et al.

[11] Patent Number: 5,579,150
[45] Date of Patent: Nov. 26, 1996

[54] OPTICAL RECORDING MEDIUM USING A CHARGE TRANSFER COMPLEX

[75] Inventors: Og K. Cho, Seoul; Kyoung S. Min, Kyoungki-do, both of Rep. of Korea

[73] Assignee: Cheil Synthetics Inc., Kyoungsangbuk-do, Rep. of Korea

[21] Appl. No.: 488,093

[22] Filed: Jun. 7, 1995

[30] Foreign Application Priority Data

Aug. 30, 1994 [KR] Rep. of Korea ............... 94-21847

[51] Int. Cl.$^6$ ............... G02F 1/03; G03C 1/492
[52] U.S. Cl. ............... 359/241; 430/270.19; 430/270.18; 430/945; 346/135.1
[58] Field of Search ............... 430/20, 19, 270.18, 430/270.15, 270.19, 945; 346/135.1; 428/1; 359/105, 90, 95, 44, 43, 241, 243

[56] References Cited

U.S. PATENT DOCUMENTS

| | | | |
|---|---|---|---|
| 4,825,408 | 4/1989 | Potember et al. | 365/113 |
| 4,851,322 | 7/1989 | Inagaki et al. | 430/270 |
| 5,192,631 | 3/1993 | Inoue et al. | 430/56 |
| 5,194,548 | 3/1993 | Yoshimura | 526/285 |
| 5,427,829 | 6/1995 | Mochizuki et al. | 428/1 |

*Primary Examiner*—Mark Hellner
*Attorney, Agent, or Firm*—Burns, Doane, Swecker & Mathis, L.L.P.

[57] ABSTRACT

An optical recording medium using a charge transfer complex is disclosed. A charge transfer complex (cyanine-TCNQ) is formed from cyanine-based dyes having the following formula (I).

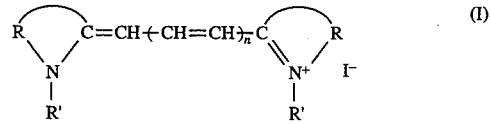

(Wherein,
R represents heteroaromatic residue,
R' represents alkyl group, and
n represents a positive integer not less than 2)
with TCNQ or derivatives thereof to apply the complex as a recordable material in a semiconductor laser. To record information, a laser beam is focused to the optical recording medium, the cyanine-TCNQ in the recording layer absorbs the laser beam and is melted or decomposed. Reproducing can be accomplished by reading the reflectivity difference between the recording portion and the non-recording portion with lower power than the recording laser.

5 Claims, 5 Drawing Sheets

OPTICAL RECORDING MEDIUM USING A CHARGE TRANSFER COMPLEX

BACKGROUND OF THE INVENTION

The present invention relates to an optical recording medium onto which data is recordable and readable using a laser light source. The optical recording medium is useful as a recording medium with both higher data storage density and higher capacitance for recording a variety of information or pictures. More particularly, the present invention relates to an optical recording medium using a charge transfer complex. Data is recorded by irradiating a laser beam onto organic dyes formed in a recording layer wherein the dyes absorb the laser light and melt or decompose. Data is reproduced by reading the reflectivity difference between a recording portion and a non-recording portion. In accordance with the invention disclosed herein, cyanine-based dyes are applied in the optical recording medium by forming charge transfer complex (cyanine-TCNQ) with TCNQ (tetracyanoquinodimethane) or derivatives thereof as a recordable material and thereby remarkably improving a recording intensity.

Information recording media utilizing a high energy density beams, such as laser beams, have been developed in recent years and are put to practical use. Such recording mediums are called optical discs and their practical applications have been found, for example, as video discs and audio discs as well as disc memory for large-capacity computers and large-capacity static image files.

With the explosion of a variety of information in accordance with orientation toward an information-intensive society, recording media have been required to have increased data storage density and increased storage capacity. In response to this need, recording techniques known generally as magnetooptic recordings were developed. A magnetooptic recording medium is substantially high in data storage density. In addition, it is a non-contact write/read method, so that it is a relatively simple means for data storage, and it can enjoy longevity. However, there are many difficulties in the preparation of magnetooptic recording media, as magnetic materials of heavy metals are used and an expensive and complicated apparatus for vacuum deposition or sputtering is required.

Organic optical recording media using an organic dyes for recording material are increasingly employed as a promising alternative for data storage. Organic optical recording media are inexpensive and can be prepared using a simple process, (e.g. spin-coating). This organic optical recording medium is being watched with keen interest in the field of optical recording medium.

Relative to their operation, optical recording media include two types, that is, one capable of recording (or writing) information only once (i.e., WORM: write once read many type) and the other capable of recording and erasing information repeatedly (i.e., erasable type). Specifically, WORM type optical recording media of heat mode is used as a means for recording and reproducing data of images such as characters, diagrams, etc. or sound. Information on the WORM type optical recording medium is recordable only once by the user, and so is an appropriate recording medium for recording, storing and keeping information, in contrast to a compact disk-read only memory (CD-ROM) already has information recorded on it when it reaches the end user.

Among the organic dyes used in manufacturing the WORM type optical recording medium are cyanine-based and melocyanine-based dyes (Japanese Patent Laid-open Sho 63-179792), triarylmethane-based dyes, polymethine-based dyes (Japanese Patent Laid-open sho 58-194595), squarylium-based dyes, azulenium-based dyes (Japanese Patent Laid-open sho 64-71791 and 64-71792), phthalocyanine-based dyes (Japanese Patent Laid-open sho 58-77043, 55-97033, 57-212639 and U.S. Pat. No. 4,458,004), naphthoquinone-based dyes (Japanese Patent Laid-open sho 58-224793 and 63-233886), pirylium-based dyes (Japanese Patent Laid-open sho 62-163050 and U.S. Pat. No. 4,513,071), etc.

Among the above dyes, phthalocyanine-based dyes have poor recording sensitivity and low solubility, and so the dye layer should be prepared using deposition process in order to form the recording layer. Deposition of the naphthoquinone-based dyes is simple, but the formed layer has low reflectivity. Most of the dyes except the cyanine-based dyes are low in solubility In addition to low reflectivity. Accordingly, the cyanine-based dyes are most widely used although these dyes are unstable against light or heat. However, with cyanine-based dyes, a little dye may absorb the laser light in the desired wavelength region for recording and have good solubility to solvents so as to form the recording layer through solution coating.

SUMMARY OF THE INVENTION

An object of the present invention is to overcome the above problems encountered in the prior art and to provide an optical recording medium which achieves satisfactory recording operation and superior workability.

It is another object of the present invention to provide an organic recording medium which is capable of being recorded by semiconductor laser (with a wavelength range of 780–830 nm) by virtue of using cyanine-TCNQ charge transfer complex as recording material.

The present invention provides an optical recording medium comprising a substrate, a recording layer of a dye-containing recording material on the substrate, a reflective layer and a protective layer disposed in sequence on the recording layer, wherein the recording material composed of TCNQ or derivatives thereof and a cyanine dyes which is capable of reacting with said TCNQ or derivatives thereof to form charge transfer complex. Recording is carried out by directing light in the range of from 780 nm to 830 nm to the recording layer to form a pit and reproduction is carried out by directing reproducing light to the pit.

That is, through using the optical recording characteristic of a charge transfer complex of cyianine-based dyes with TCNQ or derivatives thereof, most of the above-mentioned problems are reduced. The charge transfer complexes which themselves comprise both an electron donor and an electron acceptor are either in a first charge state or in a second charge state depending on the oxidation states of the organic electron acceptor. While the first charge state is characterized by relatively high electrical impedance, the second charge state is characterized by low electrical impedance. Therefore, the recording sensitivity of the optical recording medium of the present invention can be remarkably increased by using the charge transfer complex of cyanine-based dyes with TCNQ or derivatives thereof even though the dyes themselves are recordable in the semiconductor laser region.

In manufacturing the optical recording medium of the present invention, cyanine-TCNQ complex could be used solely for the recording material of the recording layer or could be used in conjunction with a polymer binder after dispersing.

BRIEF DESCRIPTION OF THE DRAWINGS

The above objects of the present invention will become more apparent by describing in detail a preferred embodiment thereof with reference to the attached drawings in which.

DETAILED DESCRIPTION OF THE INVENTION

Figure 1:
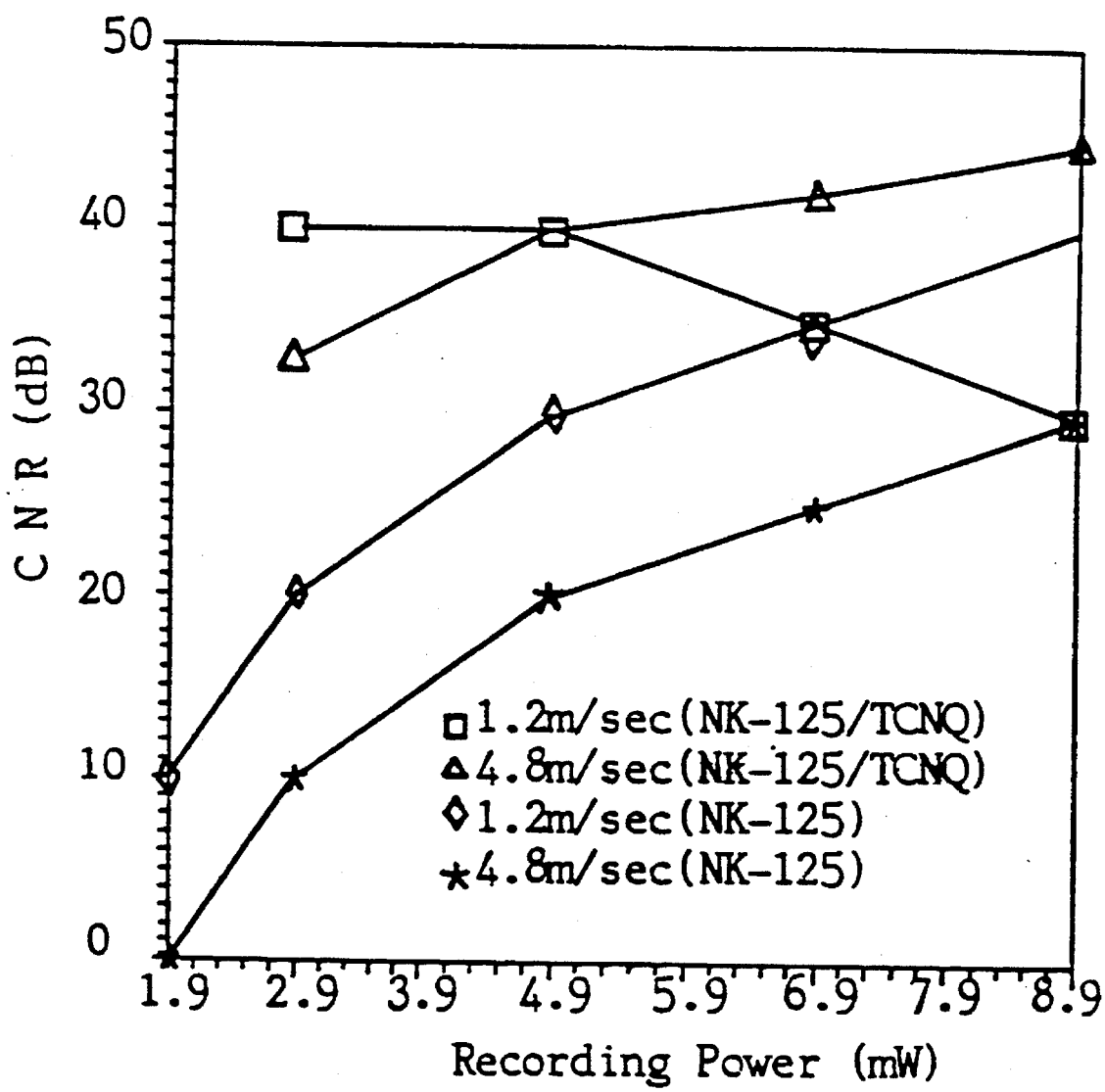
FIG. 1 is a graphical representation comparing the recording characteristic of Example 1 (in case of using NK-125 only) to the recording characteristic obtained for Comparative Example 1 (in case of using NK-125/TCNQ complex)

The present invention will be described in detail below.

In preparing the optical recording medium as taught by the present invention, at least one cyanine-based dye having the following structure in which the anion is iodide is reacted with LiTCNQ in alcohol or a mixture thereof with acetonitrile

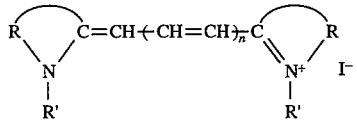

(I)

(Wherein,

R represents heteroaromatic residue,

R' represents alkyl group, and n represents a positive integer not less than 2)

The LiTCNQ may be prepared, e.g., by reacting LiI with TCNQ in a 3:2 ratio in acetonitrile. In the present invention, the recording layer consisting of cyanine/TCNQ complex is formed by dissolving the resulting cyanine-TCNQ in an appropriate solvent in an appropriate concentration of 0.1–0.2 g/10 ml and coating the resulting solution on the substrate. Examples of suitable solvents for use in the present invention are alcohols such as ethanol, methanol, 2,2,2-trichloroethanol, 2,2,2-trifluoroethanol, 2,2,3,3-tetrachloro-1-propanol, etc., ketones such as cyclohexanone, cyclopentanone, etc. or chlorohydrocarbons such as 1,1,2,2-tetrachloroethane. This coating may be preferred by processes recognized in the art, such as a dip coating process, a spray coating process, a spin coating process, a roll coating process and a bar coating process. Spin-coating process is most preferred because it allows for high degree of control of both film thickness and flatness.

The recording layer may be formed by using cyanine-TCNQ complex alone or using it in conjunction with a polymer binder after dispersing. Any polymer binder useful in optical recording medium can be employed in the present invention. Among these, a transparent and amorphous resin is preferred. Examples of appropriate binder for use in the present invention include polyvinyl alcohols, polyvinyl acetates, polyvinyl formals, polyvinyl butyrals, polystyrenes, polymethylmethacrylates, polyacrylates, polycarbonates, elastomers, etc. Resins soluble in the above-mentioned solvents are preferably selected.

Layer structure in the optical recording medium of the present invention is varied in accordance with incident direction of laser beam. In a substrate-incident type, a substrate, a recording layer consisting of a cyanine-TCNQ complex, a reflective layer and a protective layer may be sequentially formed on the substrate. When a laser beam is incident upon the recording layer, a substrate, a reflective layer, a recording layer consisting of a cyanine-TCNQ complex and a protective layer may be formed on the substrate, in this order. In both cases, the protective layer may be omitted.

The substrate which is coated with the cyanine-TCNQ complex should generally possess a surface of suitable smoothness, This may be imparted by appropriate molding or other forming techniques when the substrate is made.

The material of which the substrate is made can be any material exhibiting good structural integrity against warping and mechanical strength. Examples of suitable materials include plastics such as polyesters, acryls, polyolefins and polycarbonates, glass, reinforced glass, ceramics, metals. Furthermore, the shape and size of the substrate, and hence the recording medium, can vary depending on the application. The shape and format, for example, may be disk, tape, belt or drum. A disk shape or tape format is most preferred. Depending on the recording power, velocity and modulation frequency, the recording layer can have a thickness of about 100μ to about 10 nm.

A thin metal film of Al, Au, etc. is used as the reflective layer. An electron beam or sputtering process may be used to form the reflective layer.

A suitable protective layer, such as those known to the art, can also be used if desired to protect the recording layer from dirt, dust, scratching or abrasion. A protective layer is made typically of a UV-curing resin.

Writing of information on the optical recording medium is done by irradiating the optical recording medium with a laser beam. Under irradiation with a laser beam, the irradiated area of the recording layer of the optical recording medium absorbs energy of the beam. A rise in temperature locally occurs, and, as a result, a chemical or physical change alters or changes optical characteristics of the recording layer in the irradiated area, whereby the recording of information can be made. More particularly, if a laser beam is irradiated onto the optical recording medium of the present invention, the cyanine-TCNQ complex in the recording layer absorbs the laser and is melted or decomposed. In result, the optical characteristic of the recording layer is altered, for example, by forming pits in the recording layer.

As a result of the pit-formation in the recording layer material, an information track comprising a succession of spaced pits is formed in the information surface of the optical recording medium, the pits appearing in those surface regions which were exposed to the high intensity beam. Variations in the length and separation of the pits are representative of the recorded information. The information track of such an information record comprises (1) undisturbed surface regions alternating with (2) pit regions formed by the pit-forming process.

Reading of information from the optical recording medium can also be performed by focusing a laser beam on the information track. The reproducing beam has a constant intensity at a level insufficient to effect recording in the recording layer. The information can be reproduced by detecting the difference of the optical characteristic (e.g. reflectivity difference) between the recording portion and the non-recording portion.

The present invention is further illustrated by the following examples. The details in the following examples, however, are in no way meant to be limitative, but rather merely illustrative.

EXAMPLE 1

0.268 g of cyanine-based dye, NK-125 ($\lambda_{max}$=741 nm, in methanol solution, Nippon Kankoh-Shikisho Kenkusho) and 0.105 g of LiTCNQ were dissolved in ethanol and were mixed, while injecting nitrogen gas at an ambient temperature. After several hours, dark green NK-125/TCNQ complex was obtained by filtering the resulting reaction mixture. 0.05 g of this complex was dissolved in 5 ml of 2,2,3,3-tetrafluoro-1-propanol (TFP). This solution was coated on the Al-deposited polycarbonate substrate using a spin coater at a velocity of 2500 rpm and then dried to form a recording medium.

The recording medium obtained was tested in an optical recording tester (trademark: DDU-1000, commercially available from Pulstec. Inc.) with a wavelength of 830 nm. After recording under the conditions of frequency of 720 kHz and a duty ratio of 50%, with changes of linear velocity in a range of 1.2 to 4.8 m/sec and recording power, the results of the test were illustrated in FIG. 1.

COMPARATIVE EXAMPLE 1

0.05 g of NK-125 was dissolved in 5 ml of TFP. This solution was spin-coated on the Al-deposited polycarbonate substrate at 2500~3000 rpm according to the same manner to that of Example 1. However, tracking was formed with the dye NK-125 alone. This demonstrated that the cyanine/TCNQ complex had an improved reflectivity on the assumption that the thicknesses of the recording layer formed from dye alone and the complex were same. 0.05 g of NK-125 was dissolved in 10 ml of TFP. This solution was also coated on the substrate at a velocity of 2000 rpm, and recording the test was carried out in the same manner as that of Example 1. The results of the test were illustrated in FIG. 1 in comparison with the case using NK-125/TCNQ complex.

As shown in FIG. 1, the recording sensitivity of Example 1 (using the NK-125/TCNQ complex) is higher than that of Comparative Example 1 (using the dye NK-125 alone).

EXAMPLE 2

Figure 2:
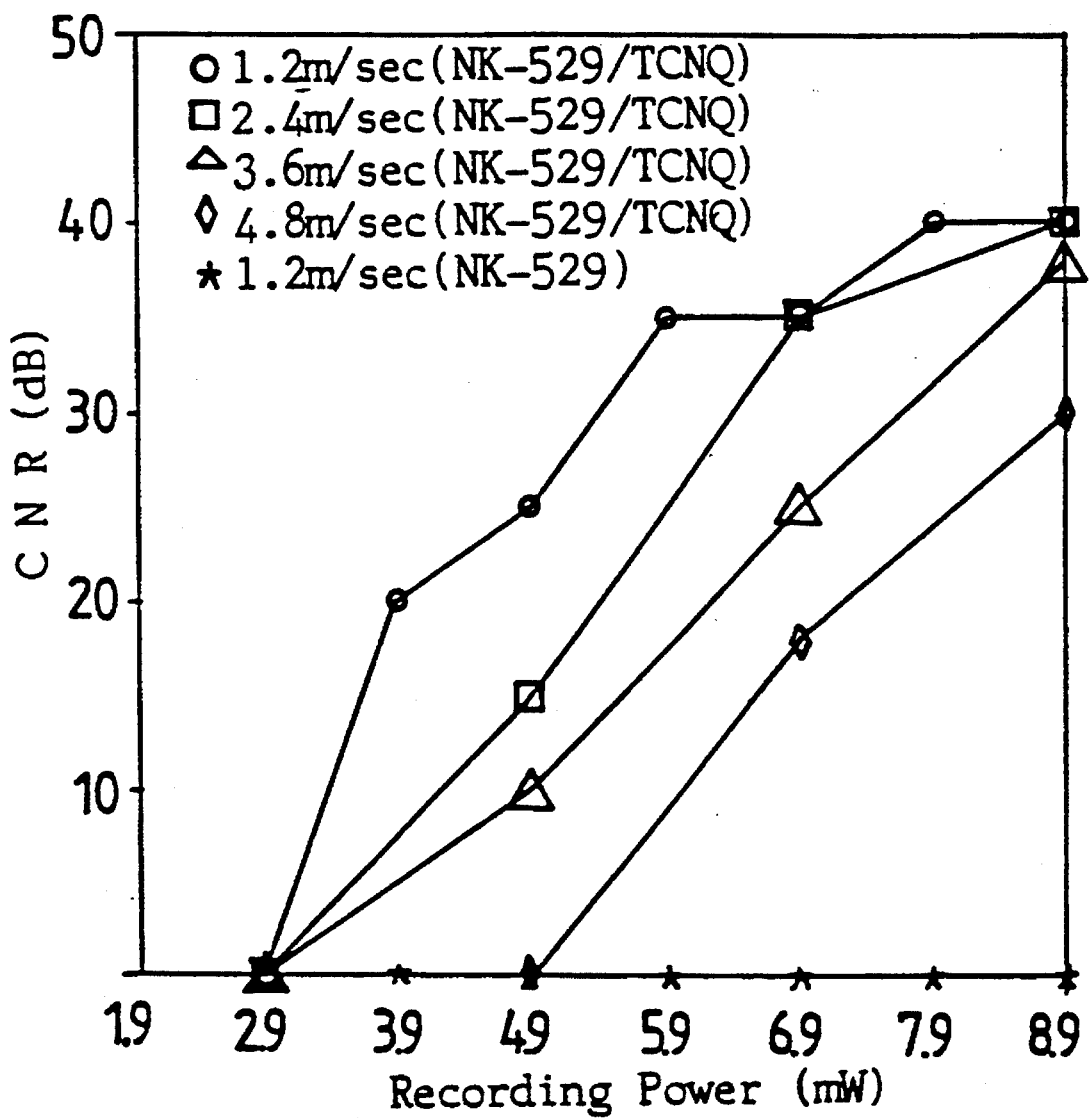
FIG. 2 is a graphical representation comparing the recording characteristic of Example 2 (in case of using NK-529 only) to the recording characteristic obtained for Comparative Example 2 (in case of using NK-529/TCNQ complex)

0.255 g of NK-529 ($\lambda_{max}$=638 nm, in methanol solution, Nippon Kankoh-Shikisho Kenkusho) and 0.105 q of LiTCNQ were reacted in ethanol, while injecting nitrogen gas at an ambient temperature. After several hours, the reactant was filtered and dark green NK-529/TCNQ complex was obtained. 0.05 g of the resulting complex was dissolved in 5 ml of TFP. The obtained solution was spin-coated on the Al-deposited polycarbonate substrate at a velocity of 500 rpm and then dried to form a recording medium. The recording medium obtained was tested in an optical recording tester (trademark: DDU-1000, commercially available from Pulstec. Inc.) with a wavelength of 830 nm. After recording under the condition of frequency of 720 kHz and a duty ratio of 50%, with changes of linear velocity in a range of 1.2 to 4.8 m/sec and recording power, the results of the test were illustrated in FIG. 2.

COMPARATIVE EXAMPLE 2

0.05 g of NK-529 alone was dissolved in 5 ml of TFP and the obtained solution was spin-coated on the Al-deposited polycarbonate substrate at a velocity of 500 rpm and then dried to form a recording medium. The recording medium obtained was tested in an optical recording tester (trademark: DDU-1000, commercially available from Pulstec. Inc.) with a wavelength of 830 nm. After recording under the same condition as that of Example 1, the results of the test were illustrated in FIG. 2.

Recording was not effected with the NK-529 cyanine dye alone. It was natural because NK-529 has maximum absorption peak at 638 nm and can not absorb light of 830 nm. However, in case of using NK-529/TCNQ complex, not only recording at 830 nm but also high-speed recording were effected. The CNR result of the recording medium was good. Therefore, the optical recording medium of the present invention might be applied as recording media using a semiconductor laser having a wavelength range of 780~830 nm.

EXAMPLE 3

Figure 3:
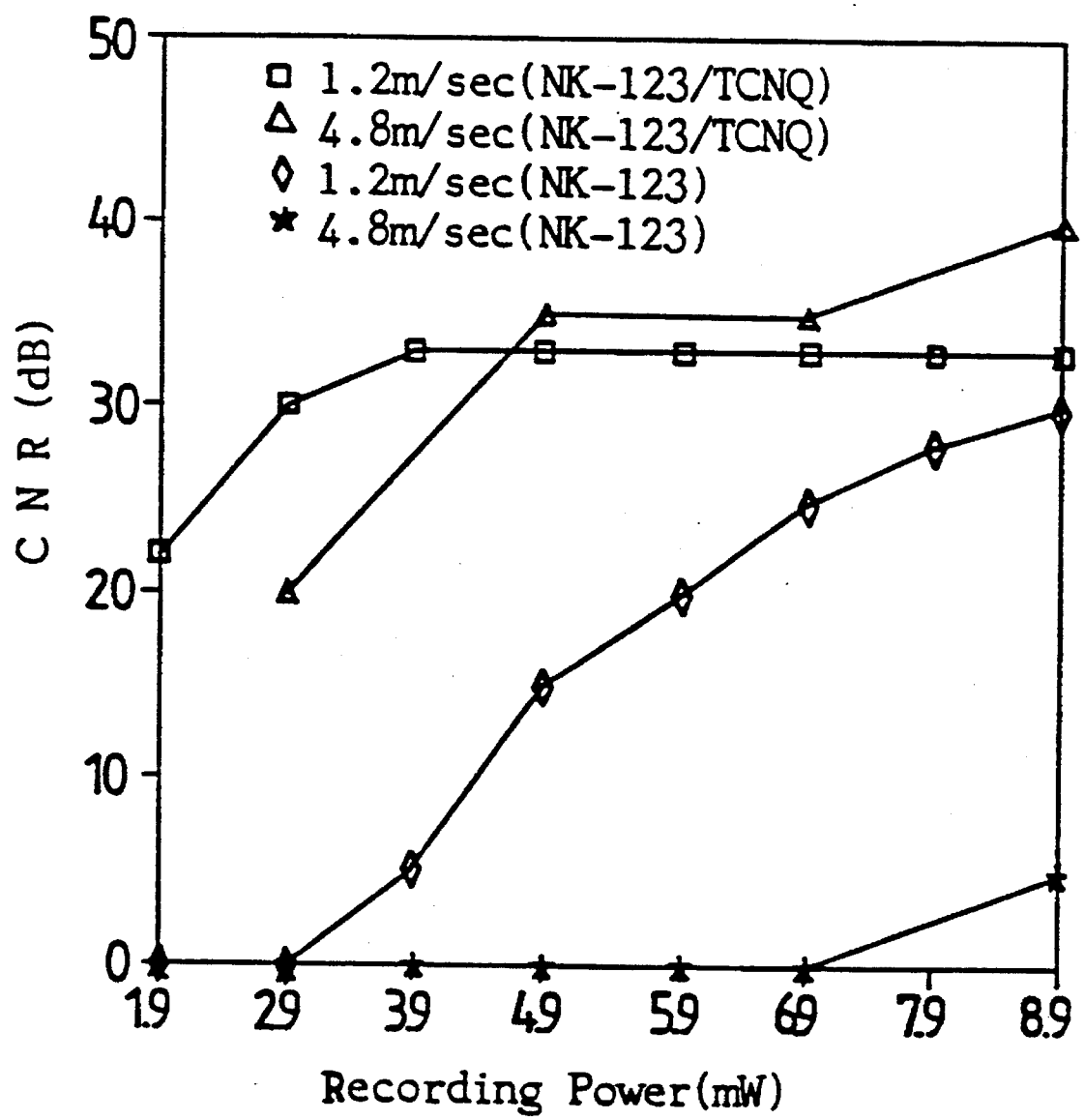
FIG. 3 is a graphical representation comparing the recording characteristic of Example 3 (in case of using NK-123 only) to the recording characteristic obtained for Comparative Example 3 (in case of using NK-123/TCNQ complex)

0.266 g of NK-123 ($\lambda_{max}$=814 nm, in methanol solution, Nippon Kankoh-Shikisho Kenkusho) and 0.105 g of LiTCNQ were reacted in a mixture of acetonitrile and ethanol of 1:1 ratio, while injecting nitrogen gas for several hours to obtain mugwort-colored NK-123/TCNQ complex. 0.05 g of the resulting complex was dissolved in 5 ml of a mixing solvent of 2,2,2-trichloroethanol (TCE) and 2,2,2-trifluoroethanol (TFE) of 2:1 ratio. The obtained solution was coated on the polycarbanate substrate at a velocity of 1500 rpm. Optical characteristics of the resulting optical recording medium was tested, and the results of the test are illustrated in FIG. 3.

COMPARATIVE EXAMPLE 3

An optical recording medium was prepared in a similar manner to that of Example 1, except that NK-123 alone was used instead of the NK-123/TCNQ complex in Example 3. The obtained dye solution was coated on the polycarbanate substrate at a velocity of 1500 rpm. Optical characteristics of the resulting optical recording medium were tested. The results of the test are illustrated in FIG. 3. In case of using NK-123/TCNQ complex of Example 3, good CNR was obtained even at high-speed recording.

EXAMPLE 4

Figure 4:
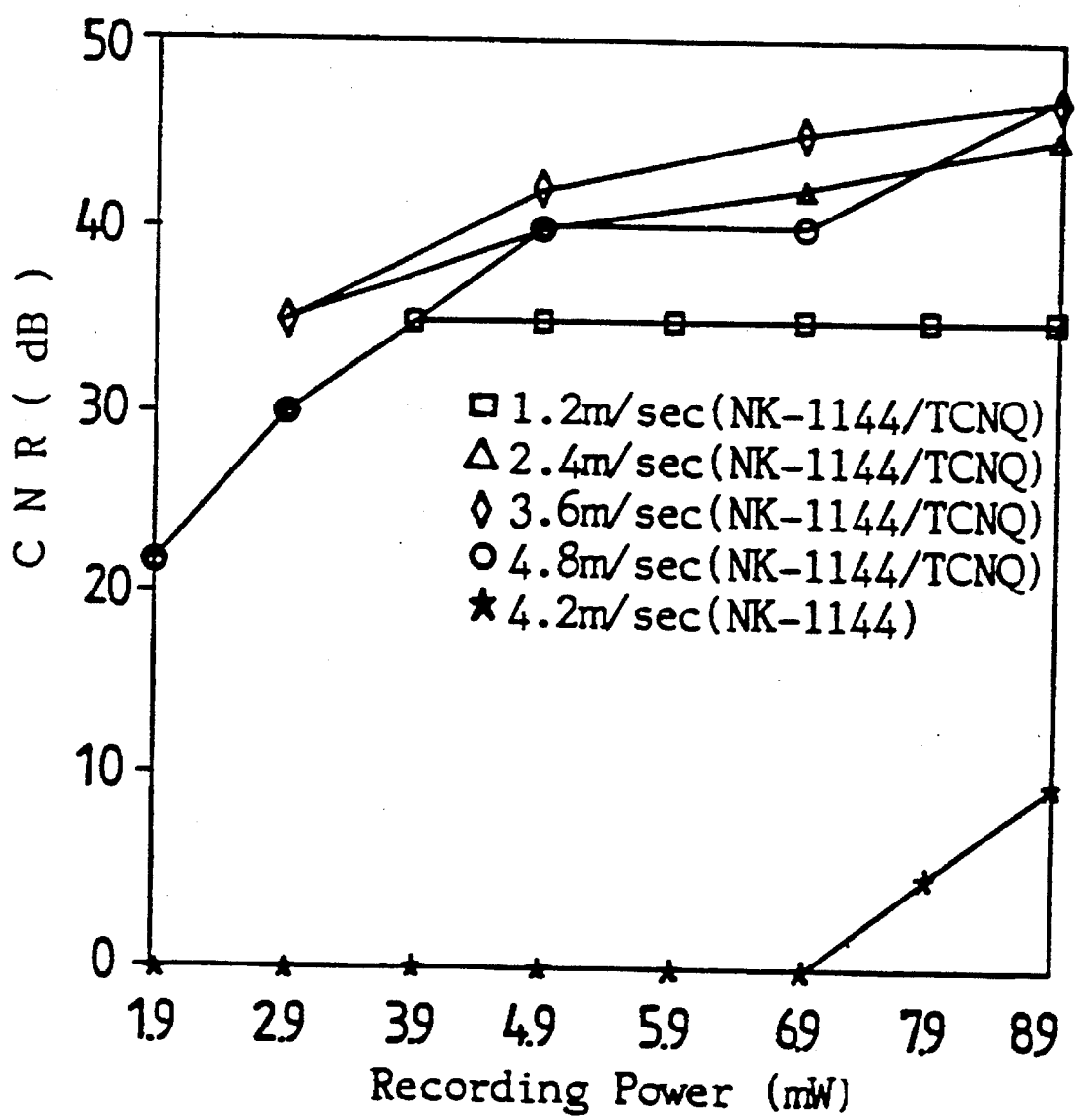
FIG. 4 is a graphical representation comparing the recording characteristic of Example 4 (in case of using NK-1144 only) to the recording characteristic obtained for Comparative Example 4 (in case of using NK-1144/TCNQ complex)

0.253 g of NK-1144 ($\lambda_{max}$=817 nm, in methanol solution, Nippon Kankoh-Shikisho Kenkusho) and 0.105 g of LiTCNQ were reacted in a mixture of acetonitrile and ethanol of 1:1 ratio, under nitrogen gas to obtain dark brown complex. 0.05 g of the resulting complex was dissolved in 5 ml of a mixture of TCE and TFE of 2:1 ratio. The obtained dye solution was coated on the polycarbanate substrate at a velocity of 1500 rpm. Optical characteristics of the resulting optical recording medium were tested. The results of the test are illustrated in FIG. 4.

COMPARATIVE EXAMPLE 4

An optical recording medium was prepared in a similar manner to that of Example 4, except that NK-1144 alone was used instead of the NK-1144/TCNQ complex in Example 4. The obtained dye solution was coated on the polycarbanate substrate at a velocity of 1500 rpm. Optical characteristics of the resulting optical recording medium were tested. The results of the test were illustrated in FIG. 4. Even though NK-1144 has maximum absorption peak at 817 nm, the recording sensitivity of the Comparative Example 4 was extremely low. However, in case of using NK-1144/TCNQ complex in Example 4, the recording sensitivity is remarkably increased.

EXAMPLE 5

Figure 5:
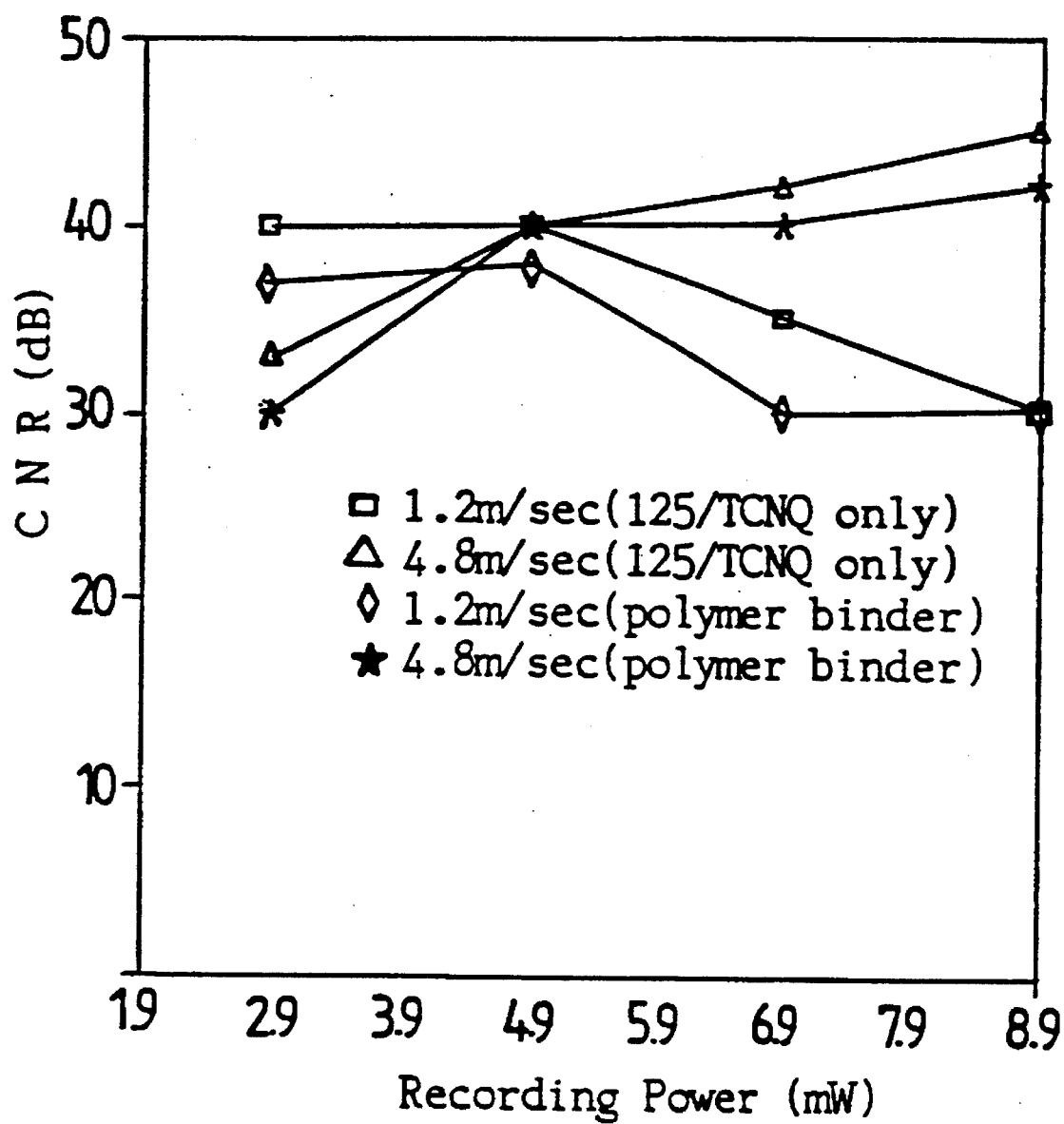
FIG. 5 is a graphical representation comparing the recording characteristic of Example 5 (in case of using NK-125/TCNQ complex only) to the recording characteristic obtained for Comparative Example 5 (in case of using NK-125/TCNQ complex in conjunction with a polymer binder).

0.05 g of NK-125 and 1 g of SK-55 (a thermoplastic ester elastomer) were dissolved in 20 ml of 1,1,2,2-tetrachloroethane. The obtained solution was spin-coated on the Al-deposited polycarbonate substrate at a velocity of 2000 rpm and then dried to form a recording medium. The resulting recording medium was tested in an optical recording tester (trademark: DDU-1000, commercially available from Pulstec. Inc.) with a wavelength of 830 nm. The results of the test are illustrated in FIG. 5.

COMPARATIVE EXAMPLE 5

In order to compare the result with that of Example 5, an optical recording medium was prepared in a similar manner to that of Example 5, except that the only NK-125/TCNQ complex was used instead of the NK-125/TCNQ complex with polymer binder (SK-55) in Example 5. The obtained dye solution was coated on the polycarbonate substrate at a velocity of 2000 rpm. Optical characteristics of the resulting optical recording medium were tested. The results of the test are illustrated in FIG. 5. The recording sensitivities of the Example 5 were almost same as that of Comparative Example 5.

As noted in the results of the examples, dyes having good solubility and no absorption wavelength region in the semiconductor laser could be changed into recordable dyes having remarkably increased recording sensitivity by forming a TCNQ complex.

Although the invention has been described with preferred embodiments, it is to be understood that variation and modifications may be resorted to as will be apparent to those skilled in the art. Such variations and modifications are to be considered within the purview and the scope of the claims appended hereto.

What is claimed is:

1. An optical recording medium comprising a substrate, a recording layer comprising a dye-containing recording material which layer is on the substrate, and a reflective layer and a protective layer disposed on the recording layer, wherein the recording material comprises (tetracyanoquinodimethane) TCNQ or a derivative thereof and at least one cyanine-based dye which is capable of reacting with said TCNQ or a derivative thereof to form charge transfer complex of formula (I):

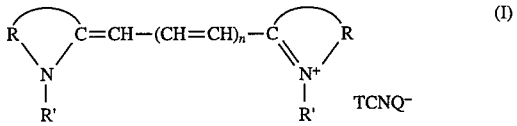

wherein,

R represents a heteroaromatic residue,

R' represents an alkyl group, and n represents a positive integer not less than two (2).

2. An optical recording medium in accordance with claim 1, wherein said recording layer comprises a cyanine/TCNQ charge transfer complex.

3. An optical recording medium in accordance with claim 1, wherein said recording layer comprises a cyanine/TCNQ (tetracyanoquinodimethane) charge transfer complex of formula (I) dispersed in a polymer resin.

4. An optical recording medium in accordance with claim 1, wherein said recording layer has a thickness of 500 to 1,500 Å.

5. An optical recording medium in accordance with claim 3, wherein said polymer resin is selected from a group consisting of polyvinyl alcohols, polyvinyl acetates, polyvinyl formals, polyvinyl butyrals, polystyrenes, polymethylmethacrylates, polyacrylates, polycarbonates and elastomers.

* * * * *